United States Patent [19]

Maeda et al.

[11] Patent Number: 4,694,067

[45] Date of Patent: Sep. 15, 1987

[54] RUBBER COMPOSITION FOR DUST COVER BOOTS

[75] Inventors: Akio Maeda, Yokohama; Takeshi Chida, Kamakura; Hirokatsu Seya, Kawasaki, all of Japan

[73] Assignee: Nippon Zeon Co., Ltd., Tokyo, Japan

[21] Appl. No.: 755,586

[22] Filed: Jul. 16, 1985

[30] Foreign Application Priority Data

Jul. 17, 1984 [JP] Japan .................................. 59-148090
Oct. 11, 1984 [JP] Japan .................................. 59-213208

[51] Int. Cl.$^4$ ...................... C08L 71/02; C08G 65/12; C08G 65/14; C08G 65/24
[52] U.S. Cl. .................................. 528/393; 524/612; 525/403
[58] Field of Search ...................... 528/393; 524/612; 525/403

[56] References Cited

U.S. PATENT DOCUMENTS

| | | | |
|---|---|---|---|
| 3,201,367 | 8/1965 | Smith | 524/612 |
| 3,285,893 | 11/1966 | Vandenberg | 528/393 |
| 3,453,357 | 7/1969 | Logan | 525/403 |
| 4,251,648 | 2/1981 | Oetzel | 525/393 |
| 4,268,644 | 5/1981 | Maeda et al. | 525/403 |
| 4,299,944 | 11/1981 | Maeda et al. | 528/89 |
| 4,310,643 | 1/1982 | Maeda et al. | 525/468 |

FOREIGN PATENT DOCUMENTS 58-2343  1/1983  Japan .................................. 525/403

*Primary Examiner*—Ronald W. Griffin
*Attorney, Agent, or Firm*—Sherman and Shalloway

[57] ABSTRACT

A rubber composition for dust cover boots comprising a copolymer rubber composed of 10 to 60 mole % of epichlorohydrin, 30 to 90 mole % of propylene oxide or both propylene oxide and ethylene oxide with the propylene oxide/ethylene oxide mole ratio being at least 1, and 0 to 15 mole % of an unsaturated epoxide, and a vulcanization agent for the copolymer rubber.

12 Claims, No Drawings

RUBBER COMPOSITION FOR DUST COVER BOOTS

This invention relates to a rubber composition for dust cover boots which comprises an epichlorohydrin/propylene oxide copolymer rubber as a main component and has overall excellent properties.

Among existing oil-resistant rubbers, chloroprene rubber (to be sometimes referred to as CR) is an excellent synthetic rubber having balanced properties, and finds widespread uses in hose covers, dust cover boots and belts of automobiles. CR has been used particularly in dust cover boots (to be sometimes referred to simply as boots) for ball joints used in the power transmission system of automobiles, which require many properties such as grease (oil) resistance, heat resistance, cold resistance, water resistance, weatherability, ozone resistance and bending resistance. As engines have been improved to meet the regulations of motor exhaust gases which came into enforcement in order to control atmospheric pollution, the dust cover boots have been required to have higher heat resistance than before. CR, however, cannot possibly meet the new requirement for higher heat resistance. In particular, since CR undergoes heat hardening-induced degradation, it cannot withstand use for a long period of time, and this may involve a danger of leading to a serious accident. Furthermore, since CR has a crystalline structure, it is regarded as unsuitable for use in districts of cold climate, and it is further suspected of having unsatisfactory dynamic ozone resistance.

On the other hand, an epichlorohydrin/ethylene oxide copolymer rubber (to be referred to as CHC) has better heat resistance, grease (oil) resistance, cold resistance and dynamic ozone resistance than CR, but poor bending resistance, and is unsuitable as a material for boots. No rubber material has been developed which can satisfy the various properties required of recent boot materials.

It is an object of this invention to provide a rubber composition for dust cover boots which retains grease (oil) resistance and bending resistance equivalent to CR and has improved heat resistance, cold resistance and dynamic ozone resistance over CR.

This object of the invention is achieved by a rubber composition for dust cover boots comprising a copolymer rubber composed of 10 to 60 mole% of epichlorohydrin, 30 to 90 mole% of propylene oxide or both propylene oxide and ethylene oxide with the propylene oxide/ethylene oxide mole ratio being at least 1, and 0 to 15 mole% of an unsaturated epoxide, and a vulcanization agent for the copolymer rubber.

The copolymer rubber used in this invention is obtained by copolymerizing epichlorohydrin and either propylene oxide or both propylene oxide and ethylene oxide, and as required an unsaturated epoxide.

Examples of the unsaturated epoxide include allyl glycidyl ether, glycidyl methacrylate, glycidyl acrylate and butadiene monoxide. By using the unsaturated epoxide as a comonomer, the heat softening-induced degradation and dynamic ozone resistance of the rubber vulcanizate are improved. If the amount of the unsaturated epoxide exceeds 15 mole%, the rubber vulcanizate undergoes heat hardening-induced degradation, loses rubbery elasticity, and becomes brittle. The suitable amount of propylene oxide or the total amount of propylene oxide and ethylene oxide is within the range of 30 to 90 mole% according to the cold resistance required of the boot. If this amount is less than 30 mole%, the cold resistance of the rubber vulcanizate becomes unsatisfactory. If it exceeds 90 mole%, the rubber vulcanizate has reduced grease resistance and has a large degree of swelling. The especially preferred proportions of the copolymer components are 15 to 55 mole% for epichlorohydrin, 35 to 85 mole% of propylene oxide or propylene oxide plus ethylene oxide, and 2 to 10 mole% for the unsaturated epoxide. If the mole ratio of propylene oxide to ethylene oxide is less than 1, the bending resistance of the rubber vulcanizate becomes insufficient. The Mooney viscosity [$ML_{1+4}(100°C.)$] of the copolymer rubber is 10 to 100.

Typical vulcanization agents used in this invention are polythiols and thioureas normally used for CHC. When the copolymer rubber contains 1 to 15 mole% of the unsaturated epoxide as a copolymer component, sulfur and sulfur donors normally used for diene-type rubbers can also be used as the vulcanization agents.

Examples of the polythiols include di- or tri-mercapto-s-triazine compounds (described, for example, in U.S. Pat. No. 3,787,376), 2,5-dimercapto-1,3,4-thiadiazole compounds (described, for example, in U.S. Pat. No. 4,288,576), 2,3-dimercaptopyrazine compounds (described, for example, in Japanese Patent Publication No. 14468/1983), 2,3-dimercaptoquinoxaline compounds (described, for example, in Japanese Patent Publication No. 14469/1983), and 3,5-dimercapto-1,2,4-triazole compounds (described, for example, in Japanese Patent Publication No. 46463/1982). Examples of the thioureas include 2-mercaptoimidazoline (ethylenethiourea) compounds, and 2-mercaptopyrimidine compounds (described, for example, in U.S. Pat. No. 3,341,490).

Typical examples of the sulfur-donors are thiuram compounds such as morpholine disulfide, tetramethylthiuram monosulfide, tetramethyl thiuram disulfide, tetraethylthiuram disulfide, tetrabutylthiuram disulfide, dipentamethylenethiuram tetrasulfide, and dimethyldiphenylthiuram disulfide. Since as is well known the sulfur donor has the action of promoting sulfur vulcanization, it can of course be used together with sulfur.

The amount of the vulcanization agent is 0.1 to 10 parts by weight per 100 parts by weight of the copolymer rubber. Needless to say, two or more vulcanization agents may be used in combination.

The rubber composition of this invention is prepared by mixing the copolymer rubber composed of epichlorohydrin, propylene oxide or both propylene oxide and ethylene oxide and optionally the unsaturated epoxide with ordinary rubber compounding agents such as a vulcanizing agent, a reinforcing agent, a filler, a plasticizer and an antioxidant by an ordinary mixer such as a roll or a Banbury mixer.

By heating the rubber composition in a mold usually at 100° to 250° C., a rubber vulcanizate is obtained. The vulcanizate has excellent grease resistance, bending resistance, heat resistance, cold resistance and dynamic ozone resistance in a well-balanced state, and is useful as a material for a dust cover boot for automobiles.

The following examples illustrate the present invention more specifically.

EXAMPLE 1

An epichlorohydrin/propylene oxide copolymer rubber prepared by a known solution polymerization method using an organoaluminum compound-type polymerization catalyst was mixed with other compounding agents in accordance with the following compounding recipe by a cold roll, and heated at 160° C. under pressure for 30 minutes to prepare a vulcanizate.

| Compounding recipe | |
|---|---|
| Epichlorohydrin/propylene oxide copolymer rubber | 100 (parts by weight) |
| Stearic acid | 1 |
| FEF carbon black | 40 |
| Red lead | 5 |
| 2-Mercaptoimidazoline | 1.2 |
| Nickel dibutyldithiocarbamate | 1.5 |

The properties of the vulcanizate were measured in accordance with JIS K-6301. The grease immersion test was carried out in accordance with the immersion test set forth in JIS K-6301 using MOLIREX No. 2 (a product of Kyodo Oils and Fats Co., Ltd.).

The results are given in Table 1. The results in Table 1 show that the vulcanizate of Run No. 1 (comparison) had poor cold resistance, and the vulcanizate of Run No. 6 (comparison) had poor grease resistance, and they are not suitable for dust cover boots.

an atmosphere having a temperature of 40° C. and an ozone concentration of 50 ppm under dynamic conditions which gave an elongation of 0 to 30% to a test specimen, and the state of tearing was observed 200 hours later.

A chloroprene rubber composition prepared in accordance with the following compounding recipe was also tested.

| Compounding recipe | |
|---|---|
| Neoprene WXJ (a product of Showa Neoprene Co., Ltd.) | 100 (parts by weight) |
| Stearic acid | 1 |
| FEF carbon black | 40 |
| Zinc oxide | 5 |
| Magnesium oxide | 4 |
| Aromatic softening agent (FFlexM, a product of Fuji Kosan Co., Ltd.) | 10 |
| 2-Mercaptoimidazoline | 0.5 |
| Octylated diphenylamine | 1 |
| N—phenyl-N—isopropyl-p-phenylenediamine | 1 |

The results are shown in Table 2. It is seen from the table that the chloroprene rubber vulcanizate had poor

TABLE 1

| | Run No. | | | | | |
|---|---|---|---|---|---|---|
| | Comparison | Invention | | | | Comparison |
| Test item | 1 | 2 | 3 | 4 | 5 | 6 |
| Composition (mole %) of the copolymer rubber | | | | | | |
| Epichlorohydrin | 70 | 50 | 40 | 30 | 40 | 8 |
| Propylene oxide | 30 | 50 | 60 | 70 | 40 | 92 |
| Ethylene oxide | — | — | — | — | 20 | — |
| Properties in a normal condition | | | | | | |
| Tensile strength (kg/cm$^2$) | 130 | 121 | 115 | 106 | 126 | 90 |
| Elongation (%) | 460 | 500 | 540 | 590 | 520 | 640 |
| Hardness (JIS) (point) | 64 | 62 | 60 | 58 | 62 | 55 |
| Heat aging test in air [After 144 hours at 135° C.] | | | | | | |
| Tensile strength change (%) | +2 | −8 | −17 | −32 | −6 | −41 |
| Hardness change (point) | +6 | +5 | +4 | +1 | +5 | +1 |
| Grease immersion test [After 70 hours at 135° C.] | | | | | | |
| Volume change (%) | +14 | +23 | +28 | +36 | +20 | +55 |
| Hardness change (point) | −6 | −9 | −10 | −13 | −7 | −23 |
| Gehman T$_{10}$ (°C.) | −27 | −34 | −39 | −44 | −40 | −59 |

EXAMPLE 2

Example 1 was repeated using each of copolymer rubbers having the compositions indicated in Table 2. The dynamic ozone degradation test was carried out in heat resistance and dynamic ozone resistance, and a vulcanizate of the epichlorohydrin homopolymer had poor cold resistance and bending resistance.

TABLE 2

| | Run No. | | | | | |
|---|---|---|---|---|---|---|
| | Comparison | Invention | | | | Comparison |
| Test item | 7 | 8 | 9 | 10 | 11 | 12 |
| Composition (mole %) of the copolymer rubber | | | | | | |
| Epichlorohydrin | Chloro- prene rubber | 40 | 40 | 50 | 50 | 100 |
| Propylene oxide | | 60 | 57 | 50 | 47 | — |
| Allyl glycidyl ether | | — | 3 | — | 3 | — |
| Properties in a normal condition | | | | | | |
| Tensile strength (kg/cm$^2$) | 197 | 112 | 124 | 119 | 133 | 150 |
| Elongation (%) | 350 | 590 | 590 | 570 | 560 | 430 |
| Hardness (JIS) (point) | 65 | 60 | 60 | 63 | 59 | 60 |
| Heat aging test in air [After 144 hours at 135° C.] | | | | | | |
| Tensile strength change (%) | −41 | −14 | −17 | −2 | −9 | +25 |
| Elongation change (%) | −86 | −59 | −66 | −60 | −68 | −58 |
| Hardness change (point) | +23 | +4 | +7 | +8 | +12 | +7 |

TABLE 2-continued

| | Run No. | | | | | |
|---|---|---|---|---|---|---|
| | Comparison | Invention | | | | Comparison |
| Test item | 7 | 8 | 9 | 10 | 11 | 12 |
| [After 72 hours at 150° C.] | | | | | | |
| Tensile strength change (%) | — | −26 | −26 | −13 | −21 | +12 |
| Elongation change (%) | — | −58 | −66 | −61 | −68 | −58 |
| Hardness change (point) | +28 | +3 | +7 | +7 | +10 | +10 |
| 180° Bending test | Broken | No crack occurred. | | | | |
| Grease immersion test | | | | | | |
| [After 70 hours at 135° C.] | | | | | | |
| Volume change (%) | +38 | +21 | +20 | +17 | +16 | +7 |
| Hardness change (point) | −10 | −8 | −7 | −5 | −2 | −1 |
| Gehman T$_{10}$ (°C.) | −34 | −39 | −40 | −35 | −35 | −21 |
| Dynamic ozone resistance test | | | | | | |
| After 200 hours | * | No cracking | | | | |
| De Mattia bending test | | | | | | |
| Number of bendings which caused cracking | More than 500,000 | | | | | 200,000 |

*Innumerable deep cracks, less than 1 mm, occured.

EXAMPLE 3

Each of polymer rubbers having the compositions indicated in Table 3 was tested in the same way as in Example 2 in accordance with the following compounding recipe.

| Compounding recipe | |
|---|---|
| Polymer rubber | 100 |
| | (parts by weight) |
| Stearic acid | 3 |
| FEF carbon black | 40 |
| Magnesium oxide | 3 |
| Calcium carbonate | 5 |
| 2,4,6-Trimercapto-s-triazine | 0.9 |
| Nickel dibutyldithiocarbamate | 1.5 |
| Cyclohexyl thiophthalimide | 1 |

In Run No. 13 (comparison), 1 part by weight of cyclohexyl thiophthalimide in the above compounding recipe was replaced by 0.3 part by weight of 1,3-diphenylguanidine in order to make the vulcanization speed agree with that of the composition of the present invention.

The results are shown in Table 3. It is seen from the table that the vulcanizate of epichlorohydrin homopolymer had poor cold resistance and bending strength.

TABLE 3

| | Run No. | | |
|---|---|---|---|
| | Comparison | Invention | |
| Test item | 13 | 14 | 15 |
| Composition (mole %) of the copolymer rubber | | | |
| Epichlorohydrin | 100 | 40 | 50 |
| Propylene oxide | — | 57 | 47 |
| Allyl glycidyl ether | — | 3 | 3 |
| Properties in a normal condition | | | |
| Tensile strength (kg/cm$^2$) | 119 | 102 | 106 |
| Elongation (%) | 450 | 610 | 560 |
| Hardness (JIS) (point) | 71 | 61 | 62 |
| Heat aging test in air | | | |
| [After 144 hours at 135° C.] | | | |
| Tensile strength change (%) | +11 | −17 | −5 |
| Elongation change (%) | −53 | −59 | −59 |
| Hardness change (point) | +4 | +3 | +4 |
| [After 72 hours at 150° C.] | | | |
| Tensile strength change (%) | +8 | −32 | −18 |
| Elongation change (%) | −53 | −62 | −63 |
| Hardness change (point) | +5 | +2 | +3 |

TABLE 3-continued

| | Run No. | | |
|---|---|---|---|
| | Comparison | Invention | |
| Test item | 13 | 14 | 15 |
| 180° Bending test | No crack occurred. | | |
| Grease immersion test | | | |
| [After 70 hours at 135° C.] | | | |
| Volume change (%) | +9 | +21 | +18 |
| Hardness change (point) | 0 | +2 | +3 |
| Gehman T$_{10}$ (°C.) | −20 | −38 | −35 |
| Dynamic ozone resistance test | | | |
| After 200 hours | No cracking | | |
| De Mattia bending test | | | |
| Number of bendings which caused cracking | 220,000 | More than 500,000 | |

EXAMPLE 4

Each of copolymer rubbers having the compositions indicated in Table 4 was tested in the same way as in Example 2 in accordance with the compounding recipe shown below. Vulcanizates were prepared by heating the compositions at 170° C. under pressure for 15 minutes.

| Compounding recipe (Run No. 16) | |
|---|---|
| Epichlorohydrin/propylene oxide/ allyl glycidyl ether terpolymer | 100 |
| | (parts by weight) |
| Stearic acid | 1 |
| HAF carbon black | 40 |
| Zinc oxide | 5 |
| Sulfur | 1 |
| Tetramethylthiuram disulfide | 1.5 |
| Cyclohexyl benzothiazyl sulfenamide | 1.5 |
| Nickel dibutyldithiocarbamate | 1.5 |
| Compounding recipe (Runs Nos. 17 and 18) | |
| Epichlorohydrin/propylene oxide/ allyl glycidyl ether terpolymer | 100 |
| | (parts by weight) |
| Stearic acid | 3 |
| HAF carbon black | 40 |
| Magnesium oxide | 3 |
| 2,4,6-Trimercapto-s-triazine | 0.9 |
| 1,3-Diphenylguanidine | 0.5 |
| Nickel dibutyldithiocarbamate | 1.5 |

The results are shown in Table 4. It is seen from the table that the polythiol-vulcanized product had better heat resistance and compression set than the sulfur-vulcanized product.

TABLE 4

| Test item | Run No. Invention | | |
|---|---|---|---|
| | 16 | 17 | 18 |
| Composition (mole %) of the copolymer rubber | | | |
| Epichlorohydrin | 30 | 30 | 30 |
| Propylene oxide | 67 | 67 | 64 |
| Allyl glycidyl ether | 3 | 3 | 6 |
| Properties in a normal condition | | | |
| Tensile strength (kg/cm$^2$) | 168 | 153 | 143 |
| Elongation (%) | 560 | 770 | 700 |
| Hardness (JIS) (point) | 65 | 59 | 61 |
| Heat aging test in air | | | |
| [After 72 hours at 150° C.) | | | |
| Tensile strength change (%) | −36 | −38 | −41 |
| Elongation change (%) | −53 | −58 | −62 |
| Hardness change (point) | +5 | +1 | +3 |
| [After 120 hours at 150° C.) | | | |
| Tensile strength change (%) | −69 | −45 | −48 |
| Elongation change (%) | −64 | −58 | −63 |
| Hardness change (point) | −4 | 0 | +1 |
| 180° Bending test | No crack occurred. | | |
| Grease immersion test | | | |
| [After 70 hours at 135° C.] | | | |
| Volume change (%) | +33 | +34 | +33 |
| Hardness change (point) | −15 | −5 | −6 |
| Gehman T$_{10}$ (°C.) | −46 | −45 | −45 |
| Dynamic ozone resistance test | | | |
| After 200 hours | No cracking | | |
| De Mattia bending test | | | |
| Number of bendings which caused cracking | More than 500,000 | | |
| Compression set (%) after 70 hours at 135° C. | 93 | 58 | 58 |

EXAMPLE 5

Each of copolymer rubbers having the compositions indicated in Table 5 was tested in the same way as in Example 4.

A chloroprene rubber composition prepared in accordance with the following compounding recipe was also tested.

| Compounding recipe | |
|---|---|
| Neoprene WXJ (given hereinabove) | 100 (parts by weight) |
| Stearic acid | 1 |
| HAF carbon black | 40 |
| Zinc oxide | 5 |
| Magnesium oxide | 4 |
| Aromatic softening agent (given hereinabove) | 10 |
| 2-Mercaptoimidazoline | 0.5 |
| Octylated diphenylamine | 1 |
| N—phenyl-N—isopropyl-p-phenylenediamine | 1 |

The results are shown in Table 5. It is seen from the table that the chloroprene rubber vulcanizate had poor heat resistance, cold resistance and dynamic ozone resistance.

TABLE 5

| Test item | Run No. | | | |
|---|---|---|---|---|
| | Comparison | Invention | | |
| | 19 | 20 | 21 | 22 |
| Composition (mole %) of the copolymer rubber | | | | |
| Epichlorohydrin | Chloro- | 30 | 40 | 30 |
| Propylene oxide | prene | 66 | 56 | 66 |
| Allyl glycidyl ether | rubber | 4 | 4 | — |
| Glycidyl methacrylate | — | — | — | 4 |
| Properties in a normal condition | | | | |
| Tensile strength (kg/cm$^2$) | 238 | 154 | 151 | 134 |
| Elongation (%) | 390 | 770 | 620 | 710 |
| Hardness (JIS) (point) | 64 | 61 | 63 | 60 |
| Heat aging test in air | | | | |
| [After 240 hours at 135° C.) | | | | |
| Tensile strength change (%) | — | −36 | −29 | −37 |
| Elongation change (%) | — | −61 | −54 | −65 |
| Hardness change (point) | +31 | +2 | +3 | +2 |
| 180° Bending test | Broken | No crack occurred. | | |
| Grease immersion test | | | | |
| [After 70 hours at 135° C.] | | | | |
| Volume change (%) | +36 | +36 | +29 | +37 |
| Hardness change (point) | −11 | −8 | −5 | −9 |
| Gehamn T$_{10}$ (°C.) | −32 | −45 | −38 | −44 |
| Dynamic ozone resistance test | | | | |
| After 200 hours | (*) | No cracking | | |
| De Mattia bending test | | | | |
| Number of bendings which caused cracking | | More than 500,000 | | |

(*): Innumerable deep cracks, less than 1 mm, occurred.

EXAMPLE 6

An epichlorohydrin/propylene oxide/allyl glycidyl ether copolymer rubber prepared by a known solution polymerization method using an organoaluminum compound polymerization catalyst was mixed with compounding agents in accordance with the following compounding recipe by a cold roll, and heated at 160° C. under pressure for 30 minutes to prepare a vulcanizate.

| Compounding recipe | |
|---|---|
| Epichlorohydrin/propylene oxide/allyl glycidyl ether copolymer rubber | 100 (parts by weight) |
| Stearic acid | 1 |
| FEF carbon black | 40 |
| Zinc oxide | 5 |
| Sulfur | 1 |
| Tetramethylthiuram disulfide | 1.5 |
| Cyclohexyl benzothiazyl sulfenamide | 1.5 |
| Nickel dibutyldithiocarbamate | 1.5 |

The properties of the vulcanizate were measured as described hereinabove, and the results obtained are shown in Table 6.

TABLE 6

| Test item | Run No. | | | | | | | |
|---|---|---|---|---|---|---|---|---|
| | Comparison | Invention | | | | | | Comparison |
| | 23 | 24 | 25 | 26 | 27 | 28 | 29 | 30 |
| Composition (mole %) of the copolymer rubber | | | | | | | | |
| Epichlorohydrin | — | 20 | 30 | 40 | 50 | 55 | 30 | 70 |
| Propylene oxide | 97 | 77 | 67 | 57 | 47 | 42 | 40 | 27 |
| Ethylene oxide | — | — | — | — | — | — | 27 | — |
| Allyl glycidyl ether | 3 | 3 | 3 | 3 | 3 | 3 | 3 | 3 |
| Properties in a normal | | | | | | | | |

TABLE 6-continued

| | Run No. | | | | | | | |
|---|---|---|---|---|---|---|---|---|
| | Comparison | Invention | | | | | | Comparison |
| Test item | 23 | 24 | 25 | 26 | 27 | 28 | 29 | 30 |
| condition | | | | | | | | |
| Tensile strength (kg/cm$^2$) | 93 | 110 | 116 | 127 | 136 | 140 | 125 | 142 |
| Elongation (%) | 440 | 410 | 420 | 430 | 450 | 440 | 430 | 460 |
| Hardness (JIS) (point) | 61 | 64 | 65 | 65 | 65 | 66 | 65 | 67 |
| Heat aging test in air | | | | | | | | |
| [After 144 hours at 135° C.] | | | | | | | | |
| Tensile strength change (%) | −6 | −8 | −9 | −14 | −20 | −22 | −10 | −31 |
| Hardness change (point) | +5 | +7 | +8 | +9 | +11 | +14 | +8 | +16 |
| Grease immersion test | | | | | | | | |
| Volume change (%) | +56 | +33 | +28 | +23 | +18 | +15 | +20 | +11 |
| Hardness change (point) | −28 | −15 | −11 | −5 | −3 | 0 | −4 | 0 |
| Gehman T$_{10}$ (°C.) | −64 | −49 | −44 | −38 | −34 | −32 | −50 | −26 |
| Dynamic ozone resistance test After 200 hours | | | | No cracking | | | | |
| De Mattia bending test Number of bendings which caused cracking | | | | More than 500,000 | | | | |

EXAMPLE 7

Each of epichlorohydrin/propylene oxide/allyl glycidyl ether copolymer rubbers having the compositions indicated in Table 7 was tested in the same way as in Example 6.

A chloroprene rubber composition prepared in accordance with the following compounding recipe was also tested. The results are shown in Table 7.

| Compounding recipe | |
|---|---|
| Neoprene WXJ (described hereinabove) | 100 |
| | (parts by weight) |
| Stearic acid | 1 |
| FEF carbon black | 40 |
| Zinc oxide | 5 |
| Magnesium oxide | 4 |
| Aromatic softening agent | 10 |
| (described hereinabove) | |
| 2-Mercaptoimidazoline | 0.5 |
| Octylated diphenylamine | 1 |
| N—phenyl-N—isopropyl-p-phenylenediamine | 1 |

TABLE 7

| | Run No. | | |
|---|---|---|---|
| | Comparison | Invention | |
| Test item | 31 | 32 | 33 |
| Composition (mole %) of the copolymer rubber | | | |
| Epichlorohydrin | Chloro- | 40 | 40 |
| Propylene oxide | prene | 55 | 53 |
| Allyl glycidyl ether | rubber | 5 | 7 |
| Properties in a normal condition | | | |
| Tensile strength (kg/cm$^2$) | 197 | 129 | 126 |
| Elongation (%) | 350 | 360 | 290 |
| Hardness (JIS) (point) | 65 | 65 | 66 |
| Heat aging test in air | | | |
| [After 144 hours at 135° C.] | | | |
| Tensile strength change (%) | −41 | −15 | −14 |
| Elongation change (%) | −86 | −67 | −69 |
| Hardness change (point) | +23 | +12 | +13 |
| After 240 hours at 135° C. | | | |
| Tensile strength change (%) | — | −33 | −32 |
| Elongation change (%) | — | −72 | −76 |
| Hardness change (point) | +28 | +12 | +13 |
| 180° Bending test | Broken | No crack occurred. | |
| Grease immersion test [After 70 hours at 135° C.] | | | |

TABLE 7-continued

| | Run No. | | |
|---|---|---|---|
| | Comparison | Invention | |
| Test item | 31 | 32 | 33 |
| Volume change (%) | +38 | +22 | +20 |
| Hardness change (point) | −10 | −4 | −1 |
| Gehman T$_{10}$ (°C.) | −34 | −39 | −39 |
| Dynamic ozone resistance test | | | |
| After 200 hours | (*) | No cracking | |
| De Mattia bending test Number of bendings which caused cracking | | More than 500,000 | |

(*): Innumerable deep cracks, less than 1 mm. occurred.

EXAMPLE 8

Each of copolymer rubbers having the compositions indicated in Table 8 was tested in the same way as in Example 6 in accordance with the following compounding recipe. The results are shown in Table 8.

| Compounding recipe | |
|---|---|
| Epichlorohydrin/propylene oxide/ allyl glycidyl ether terpolymer | 100 (parts by weight) |
| Stearic acid | 1 |
| HAF carbon black | 40 |
| Zinc oxide | 5 |
| Sulfur | 1 |
| Tetramethylthiuram disulfide | 1.5 |
| Cyclohexylbenzothiazyl sulfenamide | 1.5 |
| Nickel dibutyldithiocarbamate | 1.5 |

TABLE 8

| | Run No. | | | |
|---|---|---|---|---|
| | Comparison | Invention | | |
| Test item | 34 | 35 | 36 | 37 |
| Composition (mole %) of the copolymer rubber | | | | |
| Epichlorohydrin | — | 30 | 30 | 40 |
| Propylene oxide | 97 | 68.5 | 64 | 58 |
| Allyl glycidyl ether | 3 | 1.5 | 6 | 2 |
| Properties in a normal condition | | | | |
| Tensile strength (kg/cm$^2$) | 140 | 176 | 148 | 170 |
| Elongation (%) | 560 | 640 | 350 | 510 |
| Hardness (JIS) (point) | 61 | 62 | 68 | 66 |
| Heat aging test in air | | | | |

TABLE 8-continued

| | Run No. | | | |
|---|---|---|---|---|
| | Comparison | Invention | | |
| Test item | 34 | 35 | 36 | 37 |
| [After 120 hours at 135° C.] | | | | |
| Tensile strength change (%) | −22 | −17 | −11 | −19 |
| Hardness change (point) | +8 | +8 | +10 | +9 |
| Grease immersion test [After 70 hours at 135° C.] | | | | |
| Volume change (%) | +54 | +29 | +27 | +25 |
| Hardness change (point) | −29 | −14 | −10 | −11 |
| Gehman $T_{10}$ (°C.) | −62 | −44 | −44 | −36 |

EXAMPLE 9

Each of copolymer rubbers having the compositions indicated in Table 9 was tested in the same way as in Example 8.

For comparison, a chloroprene composition prepared in accordance with the following compounding recipe was also tested.

The results are shown in Table 9.

| Compounding recipe | |
|---|---|
| Neoprene WXJ (given hereinabove) | 100 (parts by weight) |
| Stearic acid | 1 |
| FEF carbon black | 40 |
| Zinc oxide | 5 |
| Magnesium oxide | 4 |
| Aromatic softening agent (given hereinabove) | 10 |
| 2-Mercaptoimidazoline | 0.5 |
| Octylated diphenylamine | 1 |
| N—phenyl-N—isopropyl-p-phenylenediamine | 1 |

TABLE 9

| | Run No. | | | |
|---|---|---|---|---|
| | Comparison | Invention | | |
| Test item | 38 | 39 | 40 | 41 |
| Composition (mole %) of the copolymer rubber | | | | |
| Epichlorohydrin | Chloroprene rubber | 29 | 39 | 29 |
| Propylene oxide | | 67 | 57 | 67 |
| Allyl glycidyl ether | | 4 | 4 | — |
| Glycidyl methacrylate | | — | — | 4 |
| Properties in a normal condition | | | | |
| Tensile strength (kg/cm²) | 255 | 147 | 167 | 126 |
| Elongation (%) | 370 | 380 | 430 | 340 |
| Hardness (JIS) (point) | 65 | 67 | 66 | 64 |
| Heat aging test in air [After 240 hours at 135° C.] | | | | |
| Tensile strength change (%) | — | −23 | −32 | −39 |
| Elongation change (%) | — | −53 | −65 | −54 |
| Hardness change (point) | +30 | +9 | +12 | +10 |
| 180° Bending test | Broken | No crack occurred. | | |
| Grease immersion test [After 70 hours at 135° C.] | | | | |
| Volume change (%) | +35 | +28 | +24 | +29 |
| Hardness change (point) | −10 | −14 | −9 | −15 |

TABLE 9-continued

| | Run No. | | | |
|---|---|---|---|---|
| | Comparison | Invention | | |
| Test item | 38 | 39 | 40 | 41 |
| Gehman $T_{10}$ (°C.) | −32 | −45 | −37 | −44 |
| Dynamic ozone resistance test | | | | |
| After 200 hours | (*) | No cracking | | |
| De Mattia bending test | | | | |
| Number of bendings which caused cracking | More than 500,000 | | | |

(*): Innumerable deep cracks, less than 1 mm, occurred.

What is claimed is:

1. An improved rubber composition having characteristics of improved heat resistance, cold resistance, dynamic ozone resistance and bending resistance rendering it suitable for use as dust cover boots comprising a copolymer rubber composed of 10 to 60 mole % of epichlorohydrin, 30 to 90 mole % of propylene oxide or both propylene oxide and ethylene oxide with the propylene oxide/ethylene oxide mole ratio being at least 1 and 0 to 15 mole % of an unsaturated epoxide, and a vulcanization agent for the copolymer rubber.

2. The composition of claim 1 wherein the copolymer rubber is composed of 15 to 55 mole% of epichlorohydrin, 35 to 85 mole% of propylene oxide or both propylene oxide and ethylene oxide, and 2 to 10 mole% of the unsaturated epoxide.

3. The composition of claim 1 wherein the unsaturated epoxide is selected from allyl glycidyl ether, glycidyl methacrylate, glycidyl acrylate and butadiene monoxide.

4. The composition of claim 1 wherein the amount of the vulcanization agent is 0.1 to 10 parts by weight per 100 parts by weight of the copolymer rubber.

5. The composition of claim 1 wherein the vulcanization agent is a polythiol or a thiourea.

6. The composition of claim 5 wherein the polythiol is selected from dimercapto-s-triazine compounds, trimercapto-s-triazine compounds, 2,5-dimercapto-1,3,4-thiadiazole compounds, 2,3-dimercaptopyrazine compounds, 2,3-dimercaptoquinoxaline compounds and 3,5-dimercapto-1,2,4-triazole compounds.

7. The composition of claim 5 wherein the thiourea is selected from 2-mercaptoimidazoline compounds and 2-mercaptopyrimidine compounds.

8. The composition of claim 1 wherein the copolymer rubber contains 1 to 15 mole% of the unsaturated epoxide and the vulcanization agent is selected from sulfur and sulfur donors.

9. The composition of claim 8 wherein the sulfur donors are thiuram compounds.

10. The composition of claim 1 wherein the copolymer rubber has a Mooney viscosity ($ML_{1+4}(100°$ C.)) of 10 to 100.

11. The composition of claim 1 prepared by mixing the copolymer rubber with a vulcanizing agent, a reinforcing agent, a filler, a plasticizer and an antioxidant in a roll or Banbury mixer.

12. The composition of claim 1 for use in molding dust cover boots and exhibiting grease (oil) resistance and bending resistance together with improved heat resistance, cold resistance and dynamic ozone resistance.

* * * * *